(12) United States Patent
Wang et al.

(10) Patent No.: US 10,295,083 B2
(45) Date of Patent: May 21, 2019

(54) REAL-TIME ANALYSIS SYSTEM FOR OPERATION OF WORKING SHIP BASED ON SHIP ATTITUDE MEASUREMENT

(71) Applicants: China National Offshore Oil Corporation, Beijing (CN); Offshore Oil Engineering Co., Ltd., Tianjin (CN); COTEC, INC, Beijing (CN)

(72) Inventors: Facheng Wang, Beijing (CN); Shuang Gao, Beijing (CN); Ke Tang, Beijing (CN); Zhigang Li, Beijing (CN); Yigong Zhang, Beijing (CN); Yong Luo, Beijing (CN); Jin Wang, Beijing (CN); Jun Wang, Beijing (CN); Weiwei Liu, Beijing (CN); Xiaohuan Zhu, Beijing (CN); Yang Li, Beijing (CN); Jiannan Li, Beijing (CN); Xiangwei Meng, Beijing (CN)

(73) Assignees: CHINA NATIONAL OFFSHORE OIL CORPORATION, Beijing (CN); OFFSHORE OIL ENGINEERING CO., LTD., Tianjin (CN); COTEC, INC, Beijing (CN)

(*) Notice: Subject to any disclaimer, the term of this patent is extended or adjusted under 35 U.S.C. 154(b) by 0 days.

(21) Appl. No.: 15/765,491

(22) PCT Filed: Jan. 9, 2017

(86) PCT No.: PCT/CN2017/070601
§ 371 (c)(1),
(2) Date: Apr. 3, 2018

(87) PCT Pub. No.: WO2017/133406
PCT Pub. Date: Aug. 10, 2017

(65) Prior Publication Data
US 2019/0072211 A1     Mar. 7, 2019

(30) Foreign Application Priority Data

Feb. 3, 2016    (CN) .......................... 2016 1 0076334

(51) Int. Cl.
*F16L 1/20*     (2006.01)
*G05D 1/02*     (2006.01)
(Continued)

(52) U.S. Cl.
CPC .............. *F16L 1/205* (2013.01); *B63B 39/00* (2013.01); *B63B 49/00* (2013.01); *G05D 1/0206* (2013.01)

(58) Field of Classification Search
CPC combination set(s) only.
See application file for complete search history.

(56) References Cited

U.S. PATENT DOCUMENTS 5,691,903 A * 11/1997 Racette, III ............. B63B 35/03
                                                        405/158
6,273,643 B1 * 8/2001 Baugh ....................... F16L 1/19
                                                        405/158
(Continued)

FOREIGN PATENT DOCUMENTS

CN        203337143 U     12/2013
CN        104036057 A      9/2014
(Continued)

OTHER PUBLICATIONS

CN 105204506—Description Translation (Year: 2015).*
(Continued)

*Primary Examiner* — Kyle Armstrong
(74) *Attorney, Agent, or Firm* — Gokalp Bayramoglu

(57) ABSTRACT

A real-time analysis system for operation of working ship based on ship attitude measurement includes: a central processing unit (10); a position monitoring unit (20) for detecting and providing position-attitude information and
(Continued)

heading information of the working ship at a predetermined time, and the position-attitude information and heading information of the working ship at a predetermined time is provided to the central processing unit (10); a manual data input unit (30) connected to the central processing unit (10) and capable of providing the pipeline model data to the central processing unit (10) in a manual input method; and a display unit (40) connected to the central processing unit (10) which displays the dynamic response data of the pipeline according to the processed data provided by the central processing unit (10).

10 Claims, 1 Drawing Sheet

(51) Int. Cl.
*B63B 49/00* (2006.01)
*B63B 39/00* (2006.01)

(56) References Cited

U.S. PATENT DOCUMENTS

| | | | | |
|---|---|---|---|---|
| 6,354,764 | B1* | 3/2002 | Brown | B23K 20/085 |
| | | | | 405/158 |
| 9,891,333 | B2* | 2/2018 | Valsvik | G01V 1/3852 |
| 2004/0006423 | A1* | 1/2004 | Fujimoto | G05D 1/0206 |
| | | | | 701/467 |
| 2004/0156684 | A1 | 8/2004 | Pionetti | |
| 2004/0193332 | A1* | 9/2004 | Yamakawa | G05D 1/0206 |
| | | | | 701/1 |
| 2012/0259489 | A1* | 10/2012 | Hamamatsu | B63H 25/04 |
| | | | | 701/21 |
| 2014/0114509 | A1* | 4/2014 | Venables | B63B 39/00 |
| | | | | 701/21 |
| 2016/0251064 | A1* | 9/2016 | Ishioka | B63B 49/00 |
| | | | | 701/21 |

FOREIGN PATENT DOCUMENTS

| | | |
|---|---|---|
| CN | 104075673 A | 10/2014 |
| CN | 104155043 A | 11/2014 |
| CN | 104457637 A | 3/2015 |
| CN | 204461382 U | 7/2015 |
| CN | 105204506 A | 12/2015 |
| CN | 105675195 A | 6/2016 |
| WO | 2008008127 A2 | 1/2008 |

OTHER PUBLICATIONS

Zhang Da-Peng et al. "Dynamic analysis of dynamic positioning system of vessel under different wave directions", Journal of Waterway and Harbor, vol. 36, No. 4, Aug. 2015.

Kang Zhuang et al. "Analysis of operability envelopes for pipe laying of deepwater steel catanary risers", Journal of Harbin Engineering University, vol. 37, No. 1, Jan. 2016.

* cited by examiner

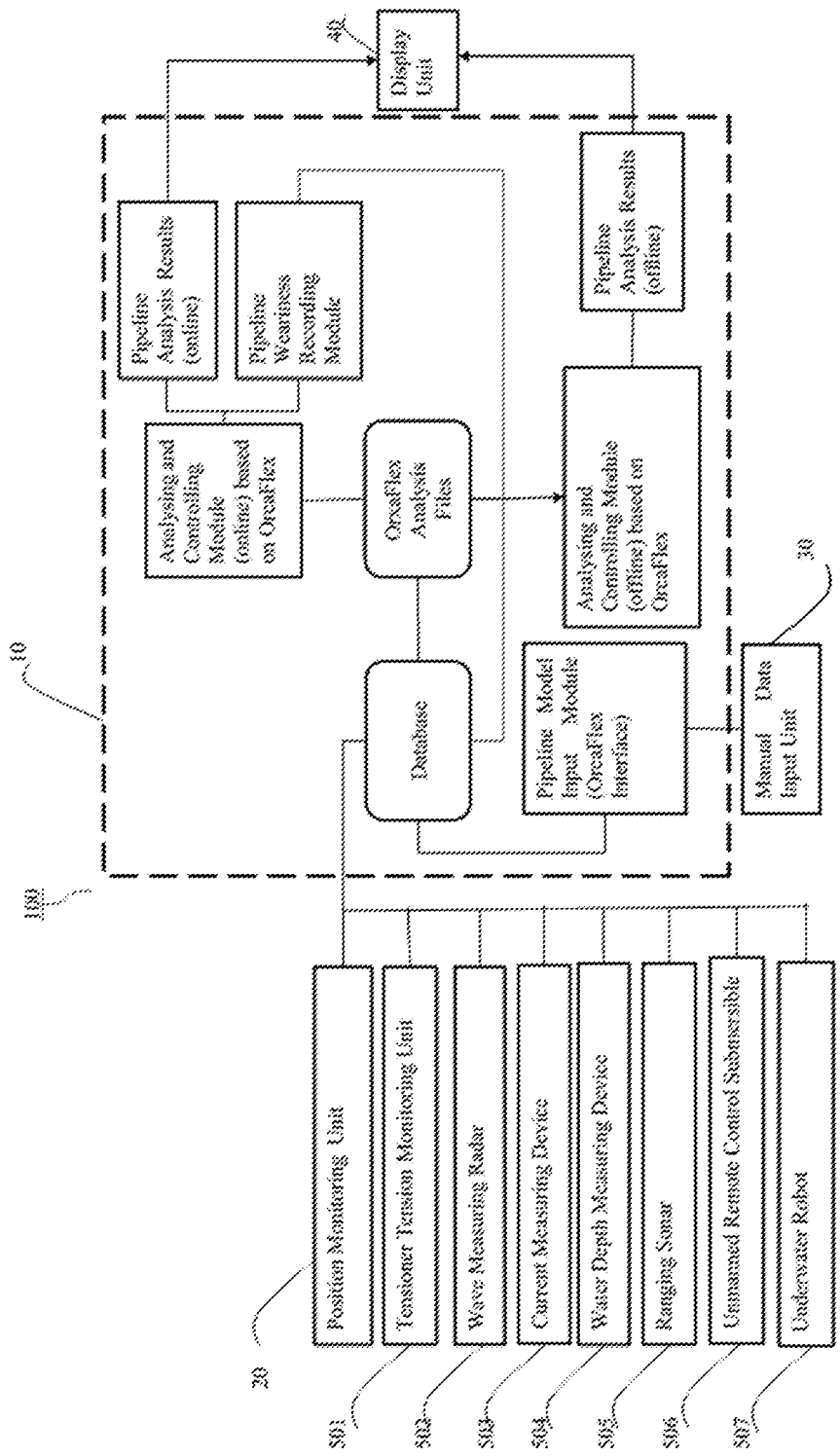

REAL-TIME ANALYSIS SYSTEM FOR OPERATION OF WORKING SHIP BASED ON SHIP ATTITUDE MEASUREMENT

CROSS REFERENCE TO RELATED APPLICATIONS

This application is the national phase entry of International Application PCT/CN2017/070601, filed on Jan. 9, 2017 which is based upon and claims priority to Chinese Patent Application No. 201610076334.6, filed on Feb. 3, 2016 the entire contents of which are incorporated herein by reference.

TECHNICAL FIELD

The present invention relates to the technical field of working ships, and particularly to a real-time analysis system for operation of working ship based on ship attitude measurement.

BACKGROUND

During the laying procedure of submarine pipelines, the installation vessel would move under the action of environmental loads, thereby exerting dynamic loads to the pipelines. In order to better complete the laying of submarine pipelines, it is necessary to evaluate these loads so as to guide the laying operation.

In the related art, in order to improve the efficiency of submarine pipeline laying, the solution adopted uses the commercial finite element software to calculate the dynamic loads of the pipelines under various environmental conditions in the design stage of installation, and then provides the allowable weather window according to the allowable dynamic loads of the pipelines, so as to guide the submarine pipeline laying operation. However, in such a method, the motions of the installation vessel are calculated by using the maximum wave height of the regular wave and a response amplitude operator (RAO) of the installation vessel, such that the results are conservative, and the operation of submarine pipeline laying depend on the judgment of the sea conditions more, which is adverse in increasing the weather window of the pipe-laying operation and causes a higher installation cost. In addition, such method is inconvenient for the real-time evaluation of the stress status of the pipelines under various movements of the installation vessel during the laying procedure.

SUMMARY OF THE INVENTION

The present invention claims the priority of Chinese patent application CN201610076334.6.

The present invention aims to at least solve one of the above mentioned technical problems in the prior art to a certain degree. In view of this objective, the present invention needs to provide a real-time analysis system for operation of working ship based on the ship attitude measurement, which can more accurately calculate the true response of the pipelines, so as to help the operators to make decisions.

A real-time analysis system for operation of working ship based on ship attitude measurement according to the embodiments of the present invention includes: a central processing unit for correcting coordinates of the upper end of a pipeline and coordinates of a pipeline anchor point of a calculation model to calculate dynamic load data of the pipeline, receiving sensor data, manual data, etc. to perform a finite element analysis for the pipeline under various loads, and storing important results in a database; a position monitoring unit for detecting and determining position information and the information about the heading direction of the working ship at a predetermined time and providing the position information and the heading information of the working ship at the predetermined time to the central processing unit; a manual data input unit, the manual data input unit is connected to the central processing unit and provides the pipeline model data to the central processing unit in a manual input manner; and a display unit, the display unit is connected to the central processing unit, and displays the pipeline dynamic load data according to processed data provided by the central processing unit, wherein the coordinates of the pipeline upper end are calculated according to the following equations.

$$X_A = x + x_v \cdot \cos h - y_v \cdot \sin h$$

$$Y_A = y + y_v \cdot \cos h + x_v \cdot \sin h$$

where, the coordinates of the pipeline anchor point are calculated according to the following equations.

$$X_B = X_A - (L+100) \cdot \cos h$$

$$Y_B = X_A - (L+100) \cdot \sin h$$

$$A_B = 180° + h$$

where, $X_A$ is the abscissa of the pipeline upper end, x is the horizontal abscissa of the working ship, $x_v$ is the horizontal abscissa of the pipeline upper end with respect to the working ship, $y_v$ is the horizontal ordinate of the pipeline upper end with respect to the working ship, h is the heading, $Y_A$ is the ordinate of the pipeline upper end, y is the horizontal ordinate of the working ship, $X_B$ is the abscissa of the pipeline anchor point, $Y_B$ is the ordinate of the pipeline anchor point, L is a length of a projection of the pipeline located between the pipeline upper end and the pipeline anchor point on a horizontal plane, $A_B$ is an azimuth angle of an embedded fixing member at the pipeline anchor point.

The real-time analysis system for operation of working ship based on ship attitude measurement according to the embodiments of the present invention can integrate measurement hardware device and a pipeline laying finite element calculation software Orcaflex together. The real-time data is measured by invoking the motion measuring device and work condition measuring device of the installation vessel and provided to the finite element software so as to control the finite element software to calculate and obtain the dynamic response of the pipeline, so the real-time analysis system for operation of working ship based on ship attitude measurement is a "quasi-real-time" analysis system, i.e. a cyclical procedure by reading the measured data for a period of time and performing calculation and outputting then reading data of another period of time and performing the calculation. The pipeline dynamic responses calculated by this solution are based on the measured actual motion data of the installation vessel (instead of the indirect calculation of the wave theory which produces a conservative calculation error), and the sea condition data (for pipeline load calculations), therefore, the true response of the pipeline can be calculated more accurately, and it helps the operators to make decisions.

According to an embodiment of the present invention, the position monitoring unit provides the central processing unit with the position information and the heading information of the engineering vessel in each predetermined time interval.

According to an embodiment of the present invention, the real-time analysis system for operation of working ship based on ship attitude measurement further includes a tensioner tension monitoring unit connected to the central processing unit for providing the tension information of the pipeline upper end to the central processing unit.

According to an embodiment of the present invention, the real-time analysis system for operation of working ship based on ship attitude measurement further includes a wave measuring radar connected to the central processing unit for providing real-time sea condition data to the central processing unit.

According to an embodiment of the present invention, the real-time analysis system for operation of working ship based on ship attitude measurement further includes a current measuring device connected to the central processing unit for providing current velocity information to the central processing unit.

According to an embodiment of the present invention, in the real-time analysis system for operation of working ship based on ship attitude measurement, the current measuring device is an acoustic doppler current profiler.

According to an embodiment of the present invention, the real-time analysis system for operation of working ship based on ship attitude measurement further includes a water depth measuring device connected to the central processing unit for providing water depth information to the central processing unit.

According to an embodiment of the present invention, the real-time analysis system for operation of working ship based on ship attitude measurement further includes a ranging sonar connected to the central processing device, the ranging sonar is used to measure the gap between a tail end of a stinger and the pipeline.

According to an embodiment of the present invention, the real-time analysis system for operation of working ship based on ship attitude measurement further includes an unmanned remote control submersible connected to the central processing unit to display underwater information on the display unit after processing by the central processing unit.

According to an embodiment of the present invention, the real-time analysis system for operation of working ship based on ship attitude measurement further includes an underwater robot connected to the central processing unit.

Additional aspects and advantages of the present invention will be partially provided in the following descriptions, and some parts of the present invention will become obvious with the following description, or may be learned by practicing the present invention.

BRIEF DESCRIPTION OF THE DRAWING

The above mentioned and/or additional aspects and advantages of the present invention will become apparent and can be easily for understood through the following description of embodiments with reference to the drawings, in which:

FIG. 1 is a schematic diagram of a real-time analysis system for operation of working ship based on a ship attitude measurement according to an embodiment of the present invention.

DETAILED DESCRIPTION OF THE INVENTION

Hereinafter, the embodiments of the present invention will be described in detail. Examples of the embodiments are illustrated in the drawings, wherein the same or similar reference numerals throughout the application represent the same or similar elements or elements having the same or similar functions. The embodiments described below with reference to the drawings are exemplary and intended to explain the present invention which should not be construed as limitations of the present invention.

In the description of the present invention, it is should be understood that positions or position relationships indicated by the terms such as "center", "longitudinal", "transverse", "length", "width", "thickness", "above", "under", "front", "back", "left", "right", "vertical", "horizontal", "top", "bottom" "in", "out", "clockwise", "anticlockwise", etc. are based on the positions or position relationships shown in the drawings. The use of these terms is merely in interest of illustrating the present invention and simplifying the description rather than indicating or implying that the referred device or element must have a particular orientation or be constructed and operated in a specific orientation. Therefore, it should not be understood as limits to the present invention.

In addition, the terms "first" and "second" are merely used for description purposes which cannot to be construed as indicating or implying relative importance or implicitly indicating the number of indicated technical features. Thus, features limited with "first", "second" may explicitly or implicitly include one or more of the features. In the description of the present invention, the phrase "a plurality of" refers to two or more items unless it is clearly and specifically defined in other ways.

In the present invention, unless there are additional specific rules or limitations, the terms "mount," "connect," "fix," etc. shall be understood in a general sense. For example, it may be a fixed connection, a detachable connection, or an integral connection, also, it may be a mechanical connection, an electrical connection, a direct connection, an indirect connection through some intermediate element, or an internal communication between two elements. Those of ordinary skill in the art can understand the specific meanings of the above-mentioned terms in the present invention according to specific circumstances.

In the present invention, unless there are additional specific rules or limitations, the first feature is "above" or "under" the second feature may include the conditions where the first feature directly contacts the second feature, and the first feature indirectly contacts the second feature and is connected to the second feature through other features between them. Moreover, the first feature is "above", "over" or "on" the second feature includes the conditions where the first feature is right above and diagonally above the second feature, or the horizontal height of the first feature is higher than that of the second feature. The first feature is "below", "under" and "beneath" the second feature includes the conditions where the first feature is right under and below the second feature, or the horizontal height of the first feature is lower than that of the second feature.

As shown in FIG. 1, the real-time analysis system for operation of working ship based on ship attitude measurement 100 according to an embodiment of the present invention includes a central processing unit 10, a position monitoring unit 20, a manual data input unit 30 and a display unit 40.

Specifically, the central processing unit 10 is configured to receive sensor data, manual data, etc., so as to perform finite element analysis on the pipeline under working conditions with various loads to obtain pipeline dynamic response data, and the pipeline dynamic response data may be displayed on the display unit 40. The position monitoring unit is used to detect and provide the position-attitude information and the heading information of the working ship at a predetermined time, wherein the position-attitude information of the working ship includes the working ship horizontal abscissa x, the working ship horizontal ordinate y and h which respectively refer to the heading, pitching, rolling and heaving. The position monitoring unit 20 may provide the position-attitude information and the heading information of the working ship at a predetermined time to the central processing unit 10. The manual data input unit 30 is connected to the central processing unit 10 and can provide the pipeline model data to the central processing unit 10 in manual input method in interest of monitoring the position information of the working ship. The display unit 40 is connected to the central processing unit 10, and displays the pipeline dynamic load data based on the processed data provided by the central processing unit 10. Further, the coordinates of the pipeline upper end are calculated according to the following equations.

$$X_A = x + x_v \cdot \cos h - y_v \cdot \sin h \quad (1)$$

$$Y_A = y + y_v \cdot \cos h + x_v \cdot \sin h \quad (2)$$

Further, the coordinates of the pipeline anchor point are calculated according to the following equations.

$$X_B = X_A - (L + 100) \cdot \cos h \quad (3)$$

$$Y_B = Y_A - (L + 100) \cdot \sin h \quad (4)$$

$$A_B = 180° + h \quad (5)$$

It should be noted that, in the above mentioned equations 1-5, $X_A$ is the abscissa of the pipeline upper end, x is the horizontal abscissa of the working ship, $x_v$ is the horizontal abscissa of the pipeline upper end with respect to the working ship, $y_v$ is the horizontal ordinate of the pipeline upper end with respect to the working ship, h is the heading, $Y_A$ is the ordinate of the pipeline upper end, y is the horizontal ordinate of the working ship, $X_B$ is the abscissa of the pipeline anchor point, $Y_B$ is the ordinate of the pipeline anchor point, L is the length of the projection of the pipeline located between the pipeline upper end and the pipeline anchor point on the horizontal plane, $A_B$ is the azimuth angle of embedded fixing member at the pipeline anchor point.

The real-time analysis system for operation of working ship based on ship attitude measurement 100 according to an embodiment of the present invention, the system may integrate measurement hardware device and pipeline laying finite element calculation software Orcaflex together. The real-time data measured by invoking the motion measuring device and working condition measuring device of the installation vessel is provided to the finite element software, which is controlled to calculate and acquire the dynamic response of the pipeline. Such system is a "quasi-real-time" analysis system, i.e. a cyclical procedure during which the measured data in a period of time is read for calculation and output and then the data in another period of time is read for calculation and output. The pipeline dynamic response calculated by this solution is based on the measured actual motion data of the installation vessel (instead of the indirect calculation of the wave theory that produces a conservative calculation error), and the sea condition data (for pipeline load calculations), thus the true response of the pipeline can be calculated more accurately, which helps operators to make decisions.

Further, according to an embodiment of the present invention, the real-time analysis system for operation of working ship based on ship attitude measurement 100 is a cyclical dynamic calculation procedure. Each dynamic calculation starts on the basis of static calculation convergence, and the position-attitude and the pipeline anchor point of the ship's model at each static calculation are different (because the motion of the ship is input in real-time, so it is changing; the entire long-distance pipeline laying procedure is simulated by using a pipeline whose length almost keeps the same; the water depth may also change; and the anchor point needs to be reasonably reset in each calculation), which may cause a non-convergence problem of the calculation of model. Therefore, the model needs to be adjusted before each calculation.

According to an embodiment of the present invention, the position monitoring unit 20 provides the central processing unit 10 with the position-attitude information and the heading information of the working ship in every same predetermined time interval. The user can set a reasonable time interval according to the demands to collect the position information and heading information of the working ship. Accordingly, the accuracy of the measurement can be improved, and the system can be timely and conveniently adjusted.

As shown in FIG. 1, according to some embodiments of the present invention, the real-time analysis system for operation of working ship based on ship attitude measurement 100 may further include a tensioner tension monitoring unit 501, the tensioner tension monitoring unit 501 is connected to the central processing unit 10 for providing the tension information of the pipeline upper end to the central processing unit 10. By doing so, the state of the pipeline can be conveniently monitored.

As shown in FIG. 1, according to an embodiment of the present invention, the real-time analysis system for operation of ship engineering based on ship attitude measurement 100 further includes a wave measuring radar 502, which is connected to the central processing unit 10 for providing the real-time sea condition data to the central processing unit 10.

As shown in FIG. 1, the real-time analysis system for operation of working ship based on ship attitude measurement according to an embodiment of the present invention further includes a current measuring device 503 which is connected to the central processing unit 10 for providing the central processing unit 10 with current velocity information. Further, according to a preferred embodiment of the present invention, the current measuring device is an acoustic doppler current profiler.

As shown in FIG. 1, the real-time analysis system for operation of working ship based on ship attitude measurement 100 according to some embodiments of the present invention further includes water depth measuring device 504, ranging sonar 505, and at least one unmanned remote control submersible 506 and underwater robot 507. Specifically, the depth measuring device 504 is connected to the central processing unit 10 for providing water depth information to the central processing unit 10. The ranging sonar 505 is used to measure the gap between the tail end of the stinger and the pipeline. The unmanned remote control submersible 506 is connected to the central processing unit 10 to display the underwater information on the display unit 40 after a processing by the central processing unit 10. The underwater robot 507 is connected to the central processing unit 10. Therefore, the real-time analysis system for operation of working ship based on the ship attitude measurement 100 can calculate the true response of the pipeline more accurately and help the operators to make decisions.

In the description of the present specification, the descriptions of the reference terms such as "an embodiment", "some embodiments", "example", "specific example", or "some examples", etc. mean the specific features, structures, materials or characteristics described with reference to the embodiment or example are included in at least one embodiment or example of the present invention. In the present specification, the exemplary representation of the above-mentioned terms does not always refer to the same embodiment or example. Moreover, the specific features, structures, materials or characteristics described may be combined in suitable manner in one or more embodiments or examples.

Although the embodiments of the present invention have been shown and described above, it should be understood that the above mentioned embodiments are exemplary and not to be construed as limitations to the present invention. Without departing from the principle and purpose of the present invention, changes, modifications, substitutions and variations can be derived from the above mentioned embodiments within the scope of the present invention by those ordinary skilled in the art.

We claim:

1. A real-time analysis system for operation of an working ship based on a ship attitude measurement comprising:
    a central processing unit, wherein the central processing unit configured to correct coordinates of a pipeline upper end and a pipeline anchor point of a calculation model and receive sensor data, and manual data, to perform a finite element analysis for the pipeline under various load conditions and store important results into a database;
    a position monitoring unit, wherein the position monitoring unit is used to detect and provide position-attitude information and heading information of the working ship at a predetermined time, and the position-attitude information and heading information of the working ship at the predetermined time are provided to the central processing unit;
    a manual data input unit, wherein the manual data input unit is connected to the central processing unit and provides pipeline model data to the central processing unit in a manual input method; and
    a display unit, wherein the display unit is connected to the central processing unit and displays pipeline dynamic response data according to processed data provided by the central processing unit;
    wherein, the coordinates of the pipeline upper end are calculated according to the following equations:

$X_A = x + x_v \cdot \cos h - y_v \cdot \sin h$ $Y_A = y + y_v \cdot \cos h + x_v \cdot \sin h$ wherein, the coordinates of the pipeline anchor point are calculated according to the following equations:

$X_B = X_A - (L+100) \cdot \cos h$ $Y_B = X_A - (L+100) \cdot \sin h$ $A_B = 180° + h$ wherein, $X_A$ is a abscissa of the pipeline upper end, x is a horizontal abscissa of the working ship, $x_v$ is a horizontal abscissa of the pipeline upper end with respect to the working ship, $y_v$ is a horizontal ordinate of the pipeline upper end with respect to the working ship, h is a heading, $Y_A$ is an ordinate of the pipeline upper end, y is a horizontal ordinate of the working ship, $X_B$ is a abscissa of the pipeline anchor point, $Y_B$ is an ordinate of the pipeline anchor point, L is a length of a projection of the pipeline located between the pipeline upper end and the pipeline anchor point on a horizontal plane, and $A_B$ is an azimuth angle of an embedding-fixing member at the pipeline anchor point.

2. The real-time analysis system for operation of an working ship based on a ship attitude measurement according to claim 1, wherein
    the position monitoring unit provides the position-attitude information and the heading information of the working ship to the central processing unit in each same predetermined time interval.

3. The real-time analysis system for operation of an working ship based on a ship attitude measurement according to claim 1 further comprising a tensioner tension monitoring unit, wherein
    the tensioner tension monitoring unit is connected to the central processing unit for providing tension information of the pipeline upper end to the central processing unit.

4. The real-time analysis system for operation of an working ship based on a ship attitude measurement according to claim 1 further comprising a wave measuring radar, wherein
    the wave measuring radar is connected to the central processing unit for providing real-time sea condition data to the central processing unit.

5. The real-time analysis system for operation of an working ship based on a ship attitude measurement according to claim 1, further comprising a current measuring device, wherein
    the current measuring device is connected to the central processing unit for providing current velocity information to the central processing unit.

6. The real-time analysis system for operation of an working ship based on a ship attitude measurement according to claim 5, wherein
    the current measuring device is an acoustic doppler current profiler.

7. The real-time analysis system for operation of an working ship based on a ship attitude measurement according to claim 1, further comprising a water depth measuring device, wherein
    the water depth measuring device is connected to the central processing unit for providing water depth information to the central processing unit.

8. The real-time analysis system for operation of an working ship based on a ship attitude measurement according to claim 1, further comprising a ranging sonar connected to the central processing unit, wherein the ranging sonar is used to measure a gap between a tail end of a stinger and the pipeline.

9. The real-time analysis system for operation of an working ship based on a ship attitude measurement according to claim 1 further comprising an unmanned remote control submersible, wherein
    the unmanned remote control submersible is connected to the central processing unit for displaying underwater information on the display unit after a processing by the central processing unit.

10. The real-time analysis system for operation of an working ship based on a ship attitude measurement according to claim 1, further comprising an underwater robot, wherein the underwater robot is connected to the central processing unit for providing pipeline ground-touching point information to the central processing unit.

\* \* \* \* \*